US007727439B2

(12) United States Patent
Moscato et al.

(10) Patent No.: US 7,727,439 B2
(45) Date of Patent: Jun. 1, 2010

(54) METHOD FOR MAKING A PRINTING BLANKET COMPRISING A BACK LAYER MADE OF A POLYMER MATERIAL AND RESULTING BLANKET

(75) Inventors: Jean-Pierre Moscato, La Chapelle Sous Rougemont (FR); José Risquez, Soultz (FR); Denis Hertzog, Berrwiller (FR); Jerzy Kuczynski, Zillisheim (FR)

(73) Assignee: Macdermid Graphic Arts SA, Cernay (FR)

( * ) Notice: Subject to any disclaimer, the term of this patent is extended or adjusted under 35 U.S.C. 154(b) by 562 days.

(21) Appl. No.: 10/305,155

(22) Filed: Nov. 27, 2002

(65) Prior Publication Data

US 2003/0124926 A1 Jul. 3, 2003

Related U.S. Application Data

(63) Continuation-in-part of application No. PCT/FR01/01680, filed on May 30, 2001.

(30) Foreign Application Priority Data

May 31, 2000 (FR) .................................. 00 07067

(51) Int. Cl.
*B29C 43/24* (2006.01)

(52) U.S. Cl. ............... 264/175; 264/171.1; 264/171.13; 264/172.19; 264/173.1

(58) Field of Classification Search .................. 442/49, 442/76, 104, 148, 164, 169; 428/909; 156/242; 101/368, 375, 401; 264/171.1, 171.13, 172.19, 264/173.1, 175
See application file for complete search history.

(56) References Cited

U.S. PATENT DOCUMENTS

| | | | | | |
|---|---|---|---|---|---|
| 4,093,764 | A * | 6/1978 | Duckett et al. | .............. | 428/113 |
| 4,277,531 | A * | 7/1981 | Picone | ........................ | 442/367 |
| 4,913,048 | A * | 4/1990 | Tittgemeyer | ................ | 101/141 |
| 5,644,985 | A * | 7/1997 | Serain et al. | ............. | 101/415.1 |
| 6,071,675 | A * | 6/2000 | Teng | .......................... | 430/302 |
| 6,172,344 | B1 * | 1/2001 | Gordon et al. | .............. | 219/529 |

FOREIGN PATENT DOCUMENTS

| | | |
|---|---|---|
| DE | 42 19 509 | 12/1993 |
| EP | 0 571 909 | 12/1993 |

(Continued)

OTHER PUBLICATIONS

Dictionary Definition of the word "assemble", The American Heritage Dictionary of the English Language, Fourth Edition, Copyright 2000 (no month).*

(Continued)

*Primary Examiner*—Andrew T Piziali
(74) *Attorney, Agent, or Firm*—Clements Bernard PLLC; Gregory N. Clements

(57) ABSTRACT

A method for making a printing blanket having an outer lithographic layer and at the back, on the side opposite to the lithographic layer, a layer made of polymer material, entails providing polymer material that can be rectified, and then rectifying the polymer material to help control a thickness of the blanket. The invention is useful in the field of printing machines.

6 Claims, 3 Drawing Sheets

FOREIGN PATENT DOCUMENTS

| | | |
|---|---|---|
| EP | 0 914 966 | 5/1999 |
| GB | 2 089 228 | 6/1982 |
| WO | 93 01003 | 1/1993 |
| WO | 93 09941 | 5/1993 |
| WO | 97 00169 | 1/1997 |

OTHER PUBLICATIONS

Dictionary Definition of the word "calender", The American Heritage Dictionary of the English Language, Fourth Edition, Copyright 2000 (no month).*

International Search Report for PCT/FR01/01680.

* cited by examiner

METHOD FOR MAKING A PRINTING BLANKET COMPRISING A BACK LAYER MADE OF A POLYMER MATERIAL AND RESULTING BLANKET

RELATED APPLICATIONS

This is a Continuation-in-Part of PCT/FR01/01680, filed May 30, 2001, which published in French as WO 01/92028.

This application is related to U.S. application Ser. No. 10/304,750, filed on even date herewith, which is a Continuation-in-Part of PCT/FR01/01678 and is entitled "Method of Making a Printing Blanket and Resulting Blanket".

This application is related to U.S. application Ser. No. 10/305,156, filed on even date herewith, which is a Continuation-in-Part of PCT/FR01/01679 and is entitled "Method of Making a Multilayer Printing Blanket and Resulting Blanket".

BACKGROUND

1. Field of the Invention

The invention concerns a method for making a printing blanket comprising an outer lithographic layer and at the back, on the side opposite to the lithographic layer, a layer made of polymer material.

2. Background of the Invention

The blankets that are known generally have a lithographic layer that is rectified and buffed. The goal of rectifying is to make the thickness of the blanket uniform. It is mandatory that the rectification be followed by a buffing step to soften the surface relief and to comply with the printing quality requirements. The disadvantage of this buffing operation is that it decreases the thickness precision obtained at the time of rectifying. Blankets with soft surface obtained by molding are also known. These blankets make it possible to obtain excellent printing quality but present the disadvantage of having greater thickness tolerances.

SUMMARY OF THE INVENTION

In one aspect, the present invention is directed to a method for manufacturing a printing blanket comprising a lithographic layer on a first side of the printing blanket, and a layer of polymer material on a back, second side of the printing blanket. The polymer material is subjected to a rectifying operation such that a thickness of the printing blanket is affected.

In another aspect, the method according to the invention is characterized in that a layer of polymer material that can be rectified is placed on the back side of a printing blanket, and this layer is rectified after the blanket has been formed.

In yet another aspect, the present invention is directed to a printing blanket having a layer of polymer material on a back side thereof, the layer of polymer material being a rectified layer.

According to one characteristic of the invention, the lithographic layer is a layer that is rectified and buffed.

According to another characteristic of the invention, the blanket is a blanket with smooth surface obtained by molding or calendering.

According to another characteristic of the invention, the blanket has a reinforcement of the beam or fabric grid type.

BRIEF DESCRIPTION OF THE DRAWINGS

The invention will be better understood, and other goals, characteristics, details and advantages thereof will appear more clearly in the explanatory description that will follow, given with reference to the attached schematic diagrams, given solely by way of example, in which.

DETAILED DESCRIPTION OF THE PREFERRED EMBODIMENTS

Figure 1:
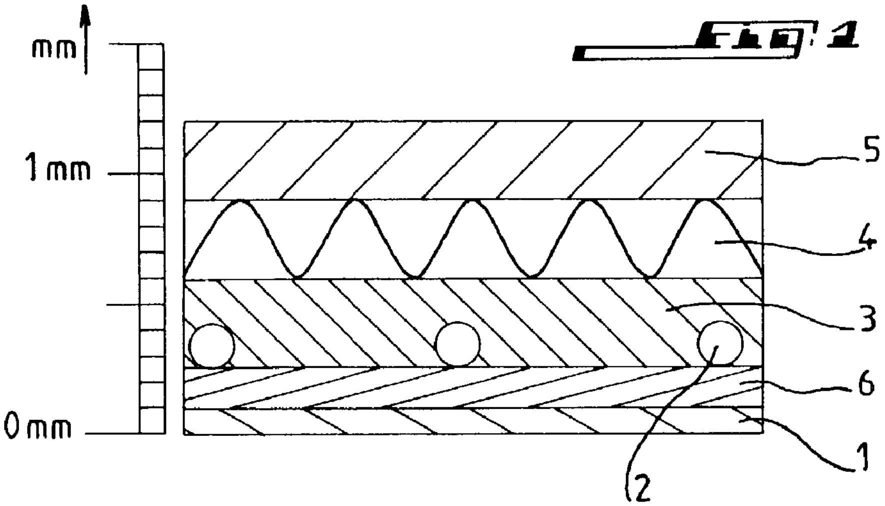
FIG. 1 is a cross sectional view of a first embodiment of a blanket according to the invention.

A multi-layer printing blanket according to the present invention has the special characteristic that the layer at the back, i.e. on the face opposite the face containing the lithographic layer, is made of a polymer material that can be rectified, that it is rectified to make the thickness of the blanket more uniform, while preserving or even improving its printing quality.

The invention can be used for blankets of which the lithographic layer has been rectified and then buffed. The rectifying, related to machining, makes it possible to extremely precisely calibrate the thickness of a blanket. However, this rectifying alone does not make it possible to obtain the surface morphology necessary to obtain satisfactory printing quality. To eliminate this disadvantage, rectifying is followed by buffing, however this destroys the precision of the rectifying somewhat. By providing, according to the invention, a layer of polymer at the back and by rectifying it after the rectifying and buffing of the lithographic layer, the defect caused by these operations can be repaired without changing the printing quality.

The rectification of the polymer layer on the back also makes it possible to regulate the thickness of blankets with smoother surface obtained by molding, and because of this, having excellent printing quality.

However, in general, the rectification is applicable to all blankets the thickness of which should be made uniform, regardless of the means used to produce a lithographic surface that ensures good printing quality. A more regular thickness of the blanket also extends its service life by allowing a more reduced covering height that limits the mechanical stresses on the blanket and retards the possible appearance of light printing. For these reasons, the rectifying step is performed after the assembly of the blanket, i.e., after the back layer has been mounted.

Compared to a blanket without rectification, the invention therefore makes it possible to obtain a gain in precision by a factor of 2, that is, an overall thickness tolerance of ±0.01 mm compared to about ±0.02 mm which corresponds to the current status of the technology.

In addition to the uniformity of thickness of the blanket, the invention also makes it possible to obtain a reduction in the total thickness of the blanket. In fact, by separating the different functions to be accomplished by the blanket, and by allocating these functions to specific layers, an optimal structure of the blanket can be established by assembling layers of fabric, compressible layers and the lithographic layer. It has been established that the use of a beam or a thread or a woven grid makes it possible to replace several fabrics and thus to obtain a reduction in thickness. The use of a beam of Aramid type thread, for example, makes it possible to economize on the relative thickness by at least one fold of fabric. The gain is at least 0.5 mm.

Another advantage of the specific structure of the blankets according to the invention is the machine stability, in particular the elimination of deformations of the blanket that has a tendency to arch.

Because the beam replaces reinforcement fabrics that contribute to the compressibility of the blanket, this compressibility is maintained in spite of the fact that fabric was removed, by making the polymer layer on the back compressible as a result.

Thus the invention allows a blanket to be made with a practically uniform thickness of 1.00 to 1.30 mm while preserving the breaking strength of known blankets that are, for the most part, from 1.7 mm to 2.0 mm thick.

The invention enables a blanket to be produced that has, from the interior toward the exterior, the following layers: a layer of slightly compressible polymer, an Aramid or equivalent beam in the warp direction, a main compressible layer, a stabilization fabric with, for example, monofilaments in the weft direction and flexible warp and a lithographic layer.

In a first variation, the stabilization fabric can be replaced by a layer of hard polymer possibly reinforced by fibers, and in a second variation, the compressible layer or layers can be made anisotropic by incorporating fibers oriented in the plane of the blanket. In this case, the stabilization layer can be omitted, with an additional reduction of thickness.

FIGS. 1 to 6 show the structure of six advantageous forms of embodiment of a blanket according to the invention, having a reduced thickness. In these figures, reference number 1 designates a layer of slightly compressible polymer, number 2 a beam, number 3 a compressible layer, number 4 a stabilization fabric or a hard reinforced layer, number 5 a lithographic layer and number 6 a compact polymer layer.

The blanket shown in FIG. 1 has, from the interior to the exterior, a layer of slightly compressible polymer 1, a compressible layer 3 into which the beam 2 is integrated, a stabilization fabric or hard reinforced layer 4, and a lithographic layer 5. The blanket has a thickness of about 1.2 mm.

Figure 2:
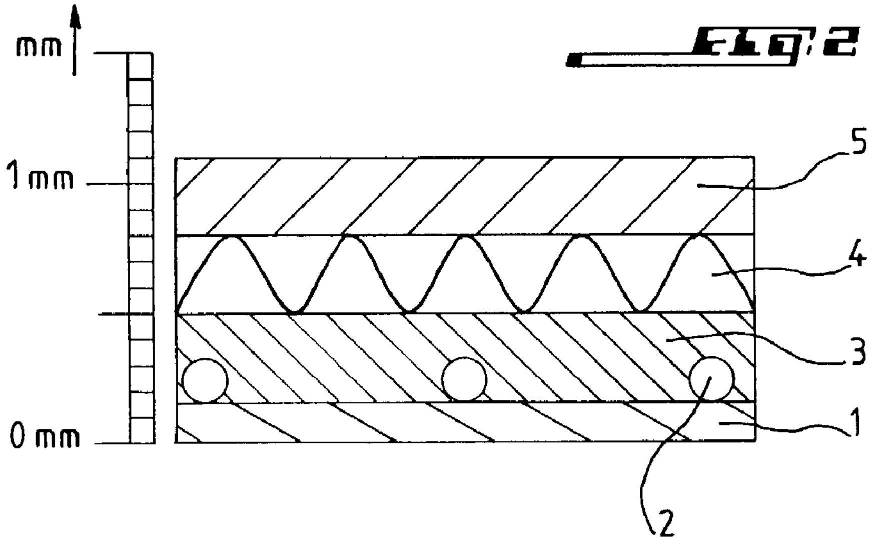
FIG. 2 is a cross sectional view of a second embodiment of a blanket according to the invention.

In the blanket according to FIG. 2, the compact polymer layer 6 shown in FIG. 1 is left out, which allows the thickness of the blanket to be reduced to about 1.1 mm.

Figure 3:
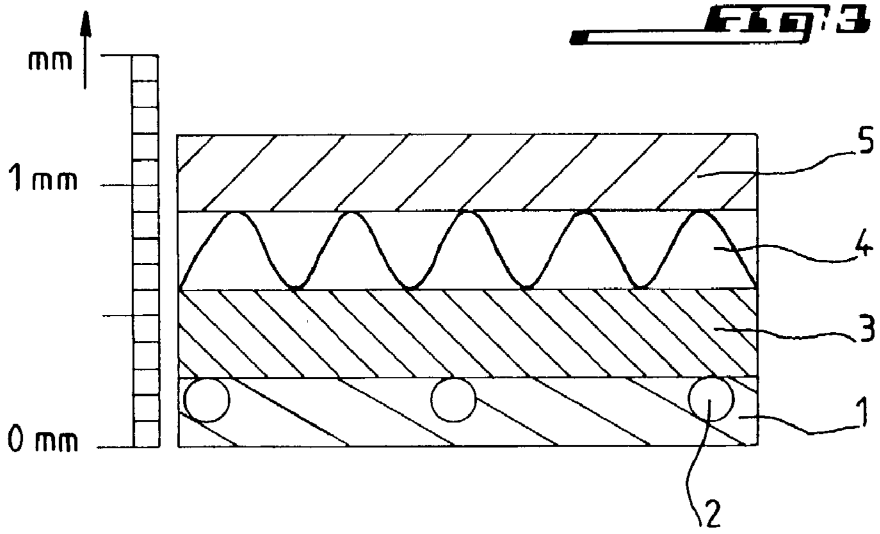
FIG. 3 is a cross sectional view of a third embodiment of a blanket according to the invention.

FIG. 3 shows a blanket in which the beam 2 is integrated into the polymer layer at the back of the blanket, the compact polymer layer 6 also being left out. The thickness of the blanket is about 1.2 mm.

Figure 4:
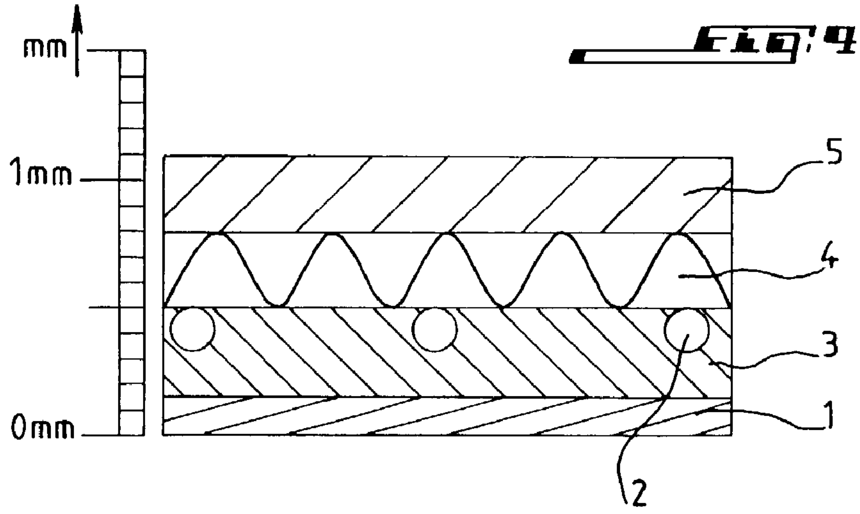
FIG. 4 is a cross sectional view of a fourth embodiment of a blanket according to the invention.

The blanket in FIG. 4 corresponds to the one in FIG. 3, the difference being that the beam 2 is integrated into the upper part of the compressible layer. The thickness of the blanket is 1.1 mm.

Figure 5:
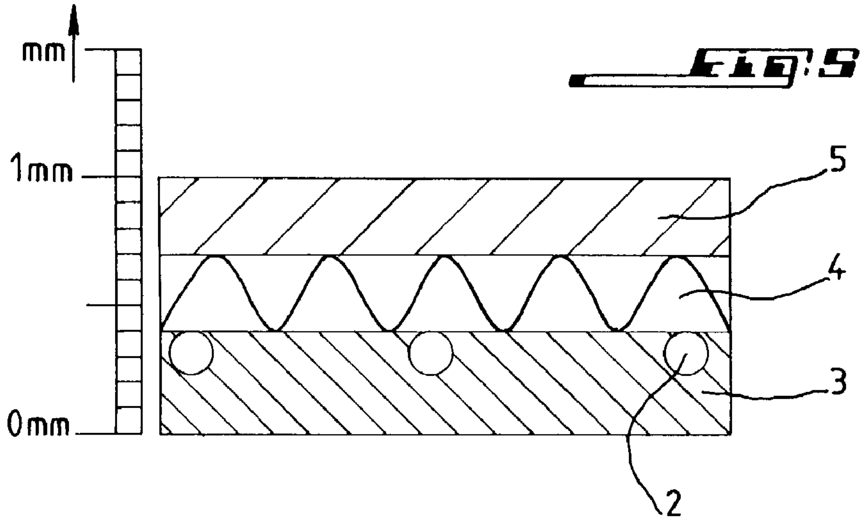
FIG. 5 is a cross sectional view of a fifth embodiment of a blanket according to the invention.

The blanket shown in FIG. 5 has an even smaller thickness of about 1 mm due to the fact that the layers 1 of compressible polymer and the layer 6 of compact polymer have been omitted, the assembly 2 being integrated into the upper part of the compressible layer 3.

Figure 6:
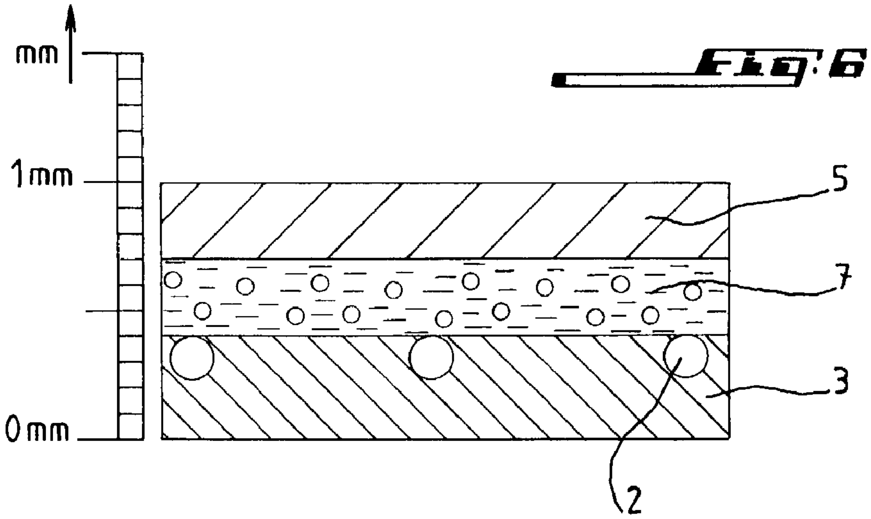
FIG. 6 is a cross sectional view of a sixth embodiment of a blanket according to the invention.

Finally, FIG. 6 shows a blanket having at the back a compressible layer 3 with the beam integrated into the upper part thereof, an anisotropic compressible layer 7 and a lithographic layer 5. The thickness of this blanket is also about 1 mm.

In the scope of the invention, it has proven advantageous to embed fine particles, e.g. glass microbeads or polymer or ceramic powders, in the surface of the lithographic layer of the blanket. Particular transfer surfaces are thus obtained having a microroughness and a specific heterogeneity. By using glass microbeads, a good water spreading property is obtained on the surface. The embedding of the particles can also be made on the surface of the layer on the back if it is made of a polymer material. This embedding makes it possible to advantageously reduce the coefficient of friction of this surface.

Figure 7:
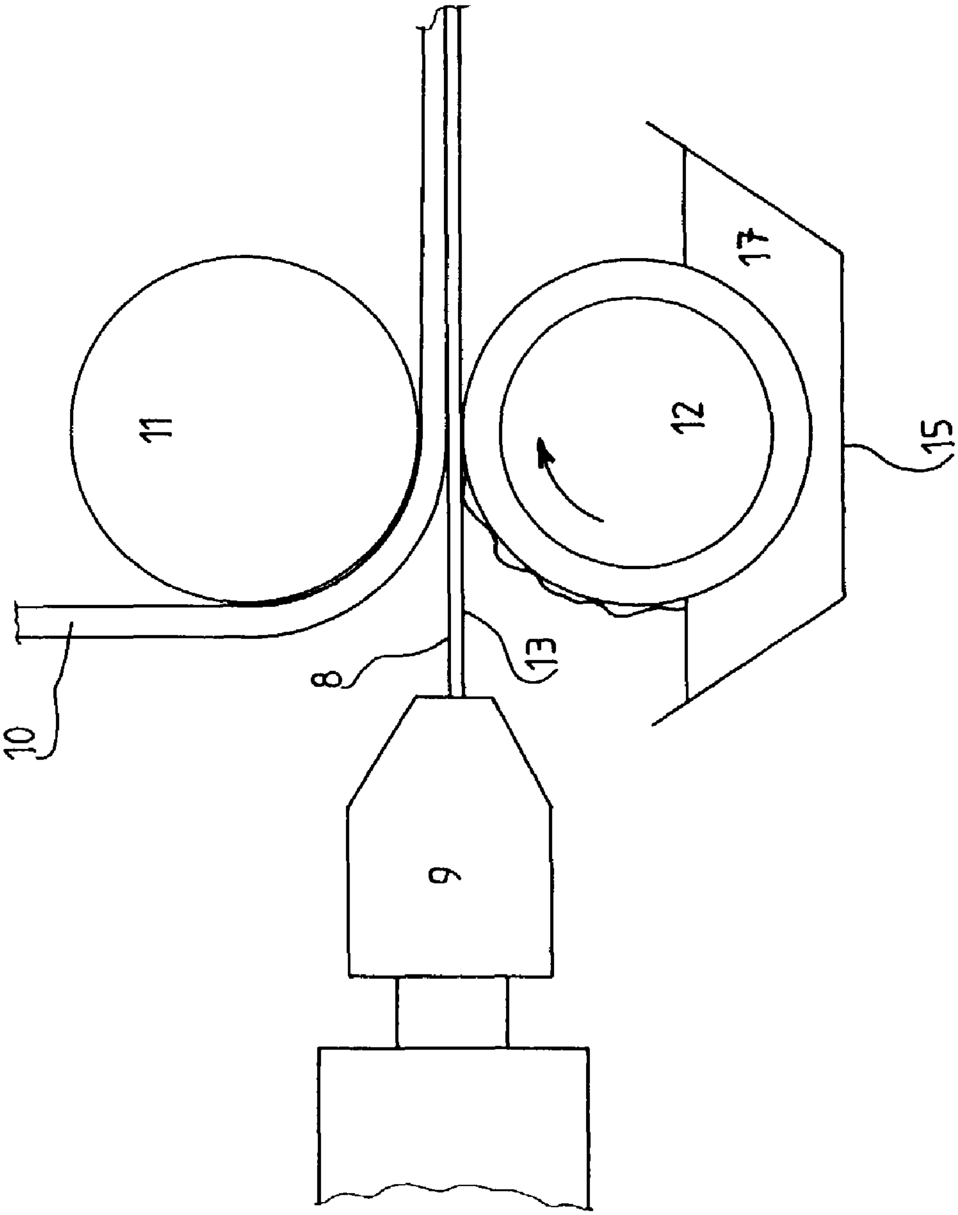
FIG. 7 is a schematic view illustrating a method for making a blanket according to the invention.

FIG. 7 illustrates a method and an installation advantageous for making this embedding. According to this figure, the polymer layer 8, the surface of which the particles must be embedded, is passed, downstream of the wire drawing extruder 9, with the body of the blanket represented by 10 between two cylinders of the calender 11 and 12. The cylinder of the calender which has come in contact with the surface to be treated 13, i.e. the lower cylinder 12, is immersed with its lower part in a vat 15 containing fine particles, e.g. in the form of a powder. The passage of the plunger cylinder through this vat causes the formation of a film of particles indicated with 17 on the surface of the cylinder that, by turning, transports and embeds in the surface 13 of the polymer layer 8. The roughness of the surface of the plunger cylinder makes up one of the quantity parameters for the particles transported. The regulated temperature of the cylinder and the pressure of the calendering are two other important control parameters for the quantity of particles embedded. The vat can be activated by a vibration movement to guarantee regular deposit on the surface of the calender plunger cylinder. A device for scraping the plunger cylinder can also be provided to meter the quantity of particles deposited and embedded on the surface of the blanket.

In a variation of embodiment, the embedding described here can be done on the surface of a previously extruded polymer film and, when applicable, rectified by simple heating of the surface thereof using known means, such as infrared banks, and passing the blanket with its layer of heated polymer on the surface between the rolls of the calender of FIG. 7.

As a variation, a film could also be deposited of liquid or pasty or doughy product which, driven by the dipping cylinder, is immobilized in contact with the hot polymer film on the surface of the blanket when it passes through the contact zone between the two rollers of the calender.

According to another feature of the invention, by using for the structure of the different layers materials and means of assembly of the layers that do not involve the use of solvents, blankets can be obtained that do not represent any hazard to man and the environment. The different layers of the blankets can be made to adhere to each other by corona, ionization or flame treatment.

Specifically, the elastomers used within the scope of the invention have the special characteristic that they do not contain thermal cross-linking agents. They are thermoplastic in nature with a suitable rheology, and the different layers may be cross-linked by radiation after assembly of all or part of the blanket.

The materials used have the property of becoming fluid at high temperature, and thus make possible the creation of thin films of good quality, in particular by extrusion.

Examples of elastomers and reinforcements that can be used in blankets according to the invention are formulations of TPU type elastomers in association with other polymers, PP, PAN and PVC based dynamic vulcanization elastomers, elastomers of the styrene family, elastomer formulations of the olefin family, olefin copolymers and functionalized olefins, elastomers of the acrylonitrile family, EPDMs or CSMs, Aramid type fiber or thread reinforcements, polyethylene or polypropylene type fiber or thread reinforcements, polyester type fiber or thread reinforcements or mixtures of such fibers or such threads.

Because of their thermoplastic implementation and therefore their property of fusing simply by heating at high temperature to create perfect joints, materials with no solvents and thus not hazardous to man or the environment used within the scope of the invention, can be used to produce tubular blankets.

Thus, for example, a tubular lithographic layer can be produced from a lithographic layer obtained by extrusion and cut to the appropriate length, and after beveling the ends, by rolling this layer onto a support sleeve, overlapping the beveled ends and heating them. This layer could be cross-linked by radiation, where appropriate, then precision ground and buffed. The support sleeve in this case could be the layer of the blanket on which the lithographic layer lies. A compressible layer could be made of a similar material with the additional possibility of ensuring the expansion of this layer during the assembly of the ends as a result of the expandable microbeads previously incorporated in the materials forming the layer. The extruded film intended to become a compressible layer could advantageously include fibers that will be oriented in the plane during extrusion in order to confer anisotropic properties to the layer. An extruded film having oriented fibers can also function as a reinforcing or stabilization or paper flow control layer.

The invention achieves numerous advantages. As a result of the rectification of the polymer layer at the back of the blanket, the thickness of said blanket is more precise and uniform. This has a direct impact on the performance of the blankets. Indeed, a controlled thickness improves the printing quality and the durability of the blankets.

The excellent printing quality obtained by a smooth, and even very smooth, printing surface can be preserved. Such type of smooth surface allows details to be printed accurately and makes it possible to generate so-called “pointue” printing or “high fidelity” printing. It allows the use of a stochastic screen. The smooth surface can be characterized by a very low roughness, with an Ra (average roughness measured by a profilometer) of less than 0.4μ compared to values of 0.8 to 1.5μ for blankets using conventional technology. The deterioration of the regularity of the thickness when a very smooth printing surface is desired, for example by buffing said surface, and the compromise made for known blankets being satisfied with a less heavy-duty buffing and therefore a less smooth surface, can be discontinued thanks to the rectification of the layer at the back, as proposed by the invention.

The reduction of the thickness of the blankets results in a reduction of vibration by allowing cylinders to be designed with narrow gaps for attaching the blanket and thus minimizing bouncing during rolling at high speed. A thin blanket according to the invention also has the following advantages: reduction of paper waste on press; possibility of implementing innovative tensioning systems; increased folding flexibility, facilitating rolling the blanket on at the attachment gap and printing can be done as close as possible to said gap. Moreover, the invention ensures a reduction in cost in so far as a thin blanket requires less material to produce, materials being the largest portion of the cost of production.

The invention also makes it possible to reduce the quantity of waste. Indeed, thinner blankets mean a smaller quantity of waste to be eliminated. Finally, by embedding particles in the surface of the lithographic layer, or the layer at the back, it is possible to obtain a desired microheterogeneity of surface and/or reduce the friction of the blanket on the support. A low coefficient of friction is very useful in facilitating attachment on the cylinder of the printing machine.

What is claimed is:

1. A method for manufacturing a printing blanket including a lithographic layer on a first, front side of the printing blanket and a rectifiable polymer material layer on a second, back side of the printing blanket, the method comprising, sequentially, assembling the printing blanket including the lithographic layer on the first, front side of the printing blanket and the polymer material layer on the second, back side of the printing blanket, and after assembling the printing blanket, rectifying the polymer material layer on the back side of the printing blanket to produce a substantially uniform thickness of the printing blanket having the rectified polymer material layer on the back side of the printing blanket.

2. The method according to claim 1, further comprising, sequentially, after assembling the printing blanket:

rectifying the lithographic layer to make the thickness of the blanket uniform, followed by buffing the lithographic layer, producing non-uniformity of the thickness of the printing blanket; and rectifying the printing blanket having the polymer material layer on the back side of the printing blanket and the buffed lithographic layer to re-establish a substantially uniform thickness of the printing blanket.

3. The method according to claim 1, further comprising, sequentially, after assembling the printing blanket:

buffing the lithographic layer to improve printing quality, wherein the buffing diminishes uniformity of the thickness of the printing blanket; and rectifying the printing blanket, having the polymer material layer on the second, back side of the printing blanket and the buffed lithographic layer on the first, front side of the printing blanket to re-establish a substantially uniform thickness of the printing blanket.

4. A method for manufacturing a printing blanket including a lithographic layer on a first, front side of the printing blanket, a rectifiable polymer material layer on a second, back side of the printing blanket, and a compressible layer in between the lithographic layer and the rectifiable polymer material layer, the method comprising, sequentially:

assembling the printing blanket including the lithographic layer on the first, front side of the printing blanket, the rectifiable polymer material layer on the second, back side of the printing blanket, and a compressible layer between the lithographic layer and the rectifiable polymer material layer; and after assembling the printing blanket, rectifying the polymer material layer on the second, back side of the printing blanket to produce a substantially uniform thickness of the assembled printing blanket.

5. A method for manufacturing a printing blanket including a lithographic layer on a first, front side of the printing blanket and a rectifiable polymer material layer on a second, back side of the printing blanket, the method comprising, sequentially, assembling the printing blanket including the lithographic layer on the first, front side of the printing blanket and the polymer material layer on the second, back side of the printing blanket, buffing the lithographic layer, producing non-uniformity of the thickness of the printing blanket, and rectifying the printing blanket having the polymer material layer on the back side of the printing blanket and the buffed lithographic layer to re-establish a substantially uniform thickness of the printing blanket.

6. A method for manufacturing a printing blanket including a lithographic layer on a first, front side of the printing blanket and a rectifiable polymer material layer on a second, back side of the printing blanket, the method comprising, sequentially, assembling the printing blanket including the lithographic layer on the first, front side of the printing blanket and the polymer material layer on the second, back side of the printing blanket, and after assembling the printing blanket, rectifying the polymer material layer on the back side of the printing blanket to produce a substantially uniform thickness of the printing blanket having the rectified polymer material layer on the back side of the printing blanket, wherein rectifying the polymer material layer gains a precision in the thickness of the blanket by a factor of 2.

* * * * *

US007727439C1

(12) EX PARTE REEXAMINATION CERTIFICATE (9102nd)

United States Patent

Moscato et al.

(10) Number: US 7,727,439 C1

(45) Certificate Issued: Jun. 26, 2012

(54) METHOD FOR MAKING A PRINTING BLANKET COMPRISING A BACK LAYER MADE OF A POLYMER MATERIAL AND RESULTING BLANKET

(75) Inventors: Jean-Pierre Moscato, La Chapelle Sous Rougemont (FR); José Risquez, Soultz (FR); Denis Hertzog, Berrwiller (FR); Jerzy Kuczynski, Zillisheim (FR)

(73) Assignee: Macdemid Graphic Arts S.A., Cernay (FR)

Reexamination Request:

No. 90/011,472, Feb. 2, 2011

Reexamination Certificate for:

| | |
|---|---|
| Patent No.: | **7,727,439** |
| Issued: | **Jun. 1, 2010** |
| Appl. No.: | **10/305,155** |
| Filed: | **Nov. 27, 2002** |

Related U.S. Application Data

(63) Continuation-in-part of application No. PCT/FR01/01680, filed on May 30, 2001.

(30) Foreign Application Priority Data

May 31, 2000 (FR) ........................................... 00 07067

(51) Int. Cl.

*B29C 43/24* (2006.01)

(52) U.S. Cl. ................ 264/175; 264/171.1; 264/171.13; 264/172.19; 264/173.1

(58) Field of Classification Search ........................ None

See application file for complete search history.

(56) References Cited

To view the complete listing of prior art documents cited during the proceeding for Reexamination Control Number 90/011,472, please refer to the USPTO's public Patent Application Information Retrieval (PAIR) system under the Display References tab.

*Primary Examiner*—Krisanne Jastrzab

(57) ABSTRACT

A method for making a printing blanket having an outer lithographic layer and at the back, on the side opposite to the lithographic layer, a layer made of polymer material, entails providing polymer material that can be rectified, and then rectifying the polymer material to help control a thickness of the blanket. The invention is useful in the field of printing machines.

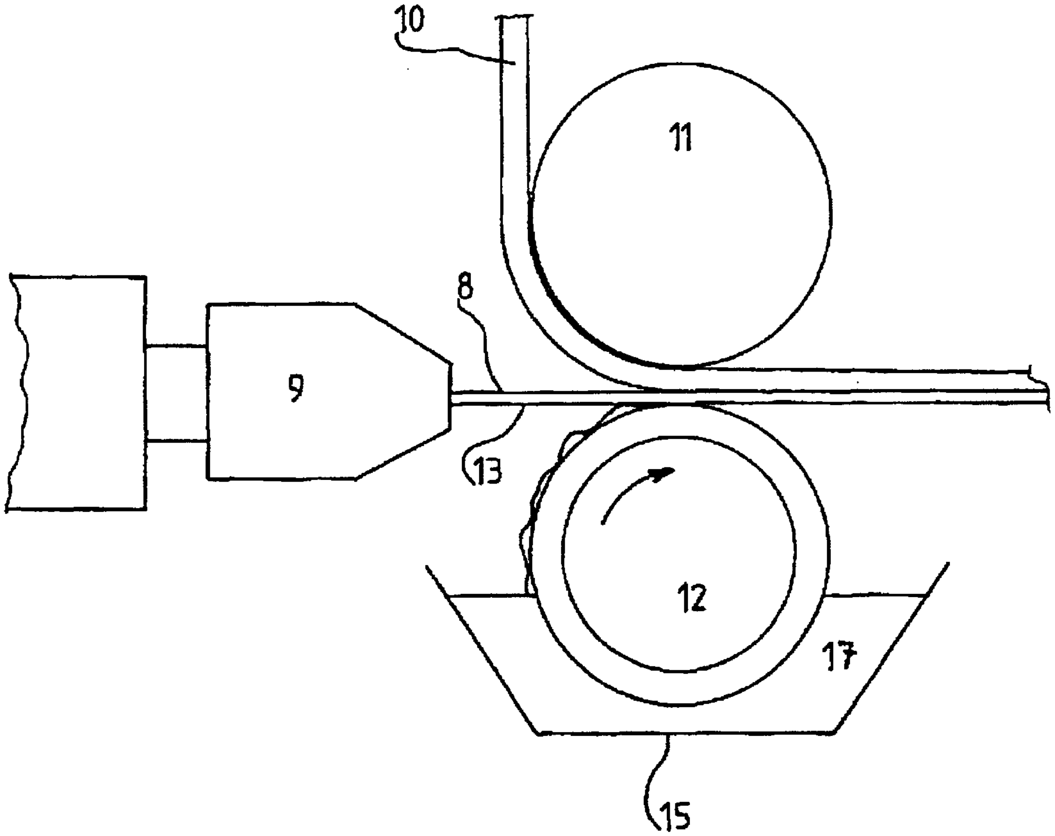

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-4 and 6 are cancelled.

Claims 1 and 5 are determined to be patentable as amended.

New claim 7 is added and determined to be patentable.

1. A method of manufacturing a printing blanket including a lithographic layer on a first, front side of the printing blanket and a rectifiable polymer material layer on a second back side of the printing blanket, the method comprising, sequentially, assembling the printing blanket including the lighographic layer on the first, front side of the printing blanket and the polymer material layer on the second, back side of the printing blanket, and after assembling the printing blanket,

*rectifying the lithographic layer to make the thickness of the blanket uniform, followed by buffing of the rectified lithographic layer to obtain surface morphology for satisfactory printing quality, but producing non-uniformity of the thickness of the printing blanket, then* rectifying the polymer material layer on the back side of the printing blanket to produce a substantially uniform thickness *without sacrificing surface quality* of the printing blanket having the rectified polymer material layer on the back side of the printing blanket.

5. A method of manufacturing a printing blanket including a lithographic layer on a first, front side of the printing blanket and a rectifiable polymer material layer on a second, back side of the printing blanket, the method comprising, sequentially, assembling the printing blanket including the lithographic layer on the first, front side of the printing blanket and the polymer material layer on the second, back side of the printing blanket,

*rectifying, then* buffing the lithographic layer, *thereby* producing non-uniformity of the thickness of the printing blanket, and rectifying the [printing blanket having the] polymer material layer on the back side of the printing blanket [and the buffed lithographic layer] to re-establish a substantially uniform thickness of the printing blanket.

*7. The method of claim 5, wherein the step of sequentially, assembling the printing blanket does not involve the use of solvents for the structure of any layer or for the assembly of the layers.*

* * * * *